United States Patent [19]

Graves

[11] Patent Number: 4,593,904

[45] Date of Patent: Jun. 10, 1986

[54] PLAYER INTERACTIVE VIDEO GAMING DEVICE

[75] Inventor: Gordon T. Graves, Dallas, Tex.

[73] Assignee: Syntech International, Inc., Dallas, Tex.

[21] Appl. No.: 591,209

[22] Filed: Mar. 19, 1984

[51] Int. Cl.$^4$ .............................................. A63F 9/18
[52] U.S. Cl. ............................. 273/1 E; 273/138 A; 273/DIG. 28; 434/323; 434/332; 434/336
[58] Field of Search .......... 273/1 E, DIG. 28, 138 A; 434/307–310, 323, 327, 332, 335, 336, 350, 351, 352, 362

[56] References Cited

U.S. PATENT DOCUMENTS

| | | |
|---|---|---|
| 2,274,811 | 3/1942 | Sisson . |
| 3,095,653 | 4/1960 | Corrigan .............................. 434/323 |
| 3,245,157 | 4/1966 | Laviana . |
| 3,255,536 | 6/1966 | Livingston . |
| 3,315,373 | 4/1967 | Diamond . |
| 3,546,791 | 12/1970 | Koos et al. . |
| 3,728,480 | 4/1973 | Baer . |
| 4,085,422 | 4/1983 | Niwata et al. . |
| 4,173,024 | 10/1979 | Miller . |
| 4,176,470 | 12/1979 | Fosner et al. . |
| 4,290,141 | 9/1981 | Anderson et al. . |
| 4,333,152 | 6/1982 | Best .............................. 273/DIG. 28 |
| 4,467,424 | 8/1984 | Hedges et al. .................... 273/138 A |
| 4,494,197 | 1/1985 | Troy et al. ....................... 273/138 A |

OTHER PUBLICATIONS

"Reader's Digest 1,000 Family Games", p. 98.

Primary Examiner—Richard C. Pinkham
Assistant Examiner—MaryAnn Stoll Lastova
Attorney, Agent, or Firm—Jerry W. Mills; Gregory M. Howison

[57] ABSTRACT

A video entertainment system includes a central station (10) that is connected to a plurality of remote display terminals (12) through a data link (14). Each of the display units (12) has a display (16), a currency receptacle (18) for receiving currency to activate the system and a currency dispenser (20) to provide a reward to the player. The players at each of the remote display terminals (12) are presented with an identical query or situation, instructions on how to respond to that query or situation and various select subjective responses. All of the players then individually select a response which is then transmitted to the central station (10). These responses are then analyzed and the proper winning selected response determined by some algorithm that compares all responses or set of responses. All of the remote terminals are provided with information regarding which response was the proper response. Each individual remote display terminal (12) determines whether the response selected by the player at that location corresponds to the least selected response, and, if so, a reward is provided.

11 Claims, 7 Drawing Figures

PLAYER INTERACTIVE VIDEO GAMING DEVICE

TECHNICAL FIELD OF THE INVENTION

The present invention pertains in general to video entertainment systems and, more particularly, to a video entertainment system that utilizes a plurality of video terminals at remote locations with a central location for interfacing the responses of all of the remote terminals.

BACKGROUND OF THE INVENTION

Video display terminals have been utilized extensively in the education and video entertainment fields and this use is still expanding. These video terminals in the past have been utilized as independent systems that perform all necessary functions at one location. These functions are such things as scorekeeping, executing an entertainment program and providing a reward to the player as a function of his play. In order to effectively utilize these terminals, they are located at various locations in a given metropolitan area.

The entertainment provided by the present video entertainment devices generally consists of a game program that is self-contained within the unit with the player playing against the machine itself. If a player wins, he is rewarded by either extended playing time, a free game or being provided a monetary reward. Although the video entertainment programs have become more sophisticated and more animated, the player must still play against the machine and the internal programming thereof. This provides some disadvantages in that the machines lack versatility and do not provide one player the ability to interact with other players or have access to responses or game techniques of other players.

In view of the above disadvantages, there exists a need for a video entertainment device that allows a player to interact with other than the internal machine program.

SUMMARY OF THE INVENTION

The present invention disclosed and claimed herein comprises a two-way video entertainment apparatus for accommodating a plurality of players. The entertainment apparatus includes a central receiving and processing station and a plurality of remote display units. A two-way data link is provided for connecting the central station to the remote display units. Each of the remote display units is capable of receiving prompting data from the data link and displaying prompt instructions in response to the prompting data. A data input panel is provided to allow a player to input a response to the displayed prompting instructions and this response is then transmitted to the data link. A payout slot is provided on each of the units so that a reward can be provided for the player in response to signals received over the data link. The central processing station generates the prompting data that is transmitted to the data link and is operable to receive the responses from all of the remote display units. All these responses are compared and a winner or set of winners selected based on the responses and an established algorithm for winner selection. For example, the players who select the "least" selected multiple choice answer to a posed question could be winners. A reward signal is then generated and then placed onto the data link and received by the remote display units. The remote display units that transmitted the least occurring response then provide a reward in accordance with the receipt of this reward signal.

In another embodiment of the present invention, a method for allowing players at a remote location to compare data comprises first generating the prompting data at a central location and then transmitting this prompting data to a plurality of remote locations. The prompting data is comprised of a query portion and a response portion. Each of the remote locations displays prompting instructions to the player in response to receiving the prompting data. A response is then input by the player to the remote location and transmitted to a central location. This response is also stored at the remote location. At the central location, each of these responses from the different remote locations is compared and the least selected response determined. A reward signal is then transmitted to the remote locations from which the least selected response is originated and an award provided to the player at that location.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
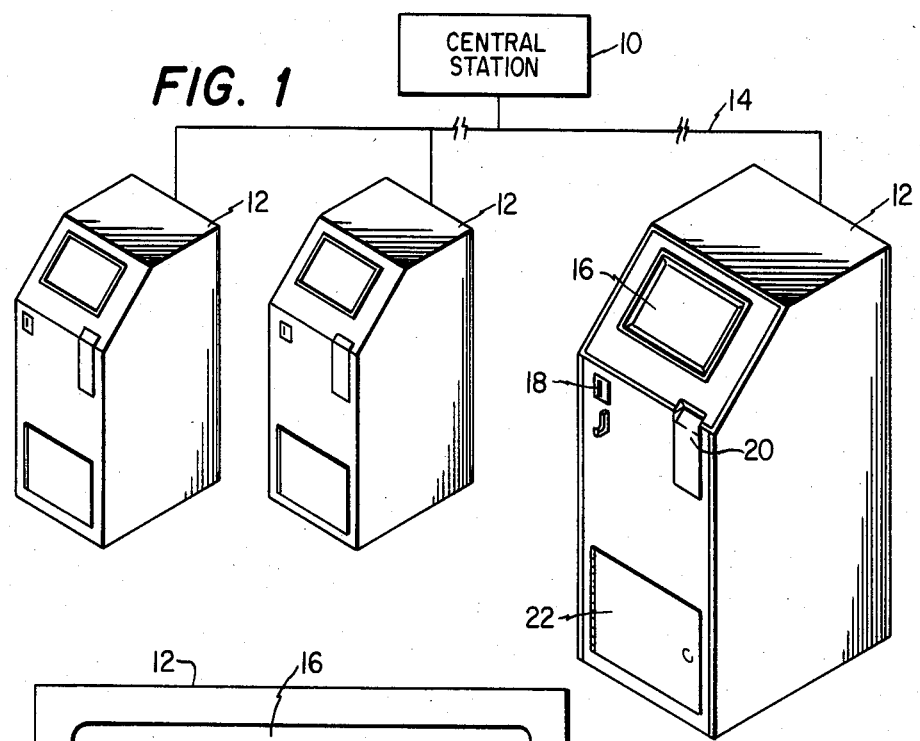
FIG. 1 illustrates a block diagram of a video entertainment system in accordance with the present invention.

Referring now to FIG. 1, there is illustrated a block diagram of a video entertainment system in accordance with the present invention. The video entertainment system includes a central station 10 which is connected to a plurality of remote display units 12 through a data link 14. The data link 14 may comprise a series of dedicated telephone lines or other data links that allow the central station 10 to maintain communication with the remote display units 12.

Each of the remote display units 12 is disposed at various remote locations with respect to the central station 10. The distance that these display terminals 12 are disposed from the central station 10 is a function of the type of data link 14 that is utilized. Given the proper data link, the remote terminal 12 can be disposed at any location in the world to operate in accordance with the present invention.

Each of the remote display units 12 has a display 16 for supplying information in response to information received from the central station 10. In order to initiate interaction with the remote display unit 12 by a player, some type of currency or token is input through a currency receptacle 18. As Will be described hereinbelow, the player interacts with the information displayed on the display 16 by touching switches or select locations on the display. A dispenser 20 is provided to supply a currency or other reward to the player in response to the interaction of the player with the information on the display 16, as will be described hereinbelow. An access door 22 is provided for servicing the remote display terminal 12.

In initiating interaction with the video entertainment system of the present invention, a player inserts the appropriate form of currency or token into the currency receptacle 18. Prior to placing currency into the receptacle 18, the remote display unit 12 displays a teaching video that explains how the system works. After the currency is deposited into the receptacle 18, the display terminal 12 allows the player access to the central station 10.

The central station 10 is in communication with all remote display terminals 12 and the associated players such that interaction between all the players can be accomplished. This interaction is in the form of a question supplied to all of the players at the same time with a list of potential responses thereto. Each of the players chooses one of the responses which is then transmitted to the central station 10 through the data link 14. After all of the responses have been received, or a predetermined time limit has been exceeded, the central station 10 analyses the responses and determines which response was the least selected response. After determining this, the central station 10 then places information onto the data link 14 indicating the least selected response such that each of the display terminals 12 can determine whether the player at that location selected the least selected response, or the central station 10 can decide which terminal 12 is the winner. If so, a reward is provided in the form of currency or token through the dispenser 20 or possibly in the form of additional play.

Figure 2:
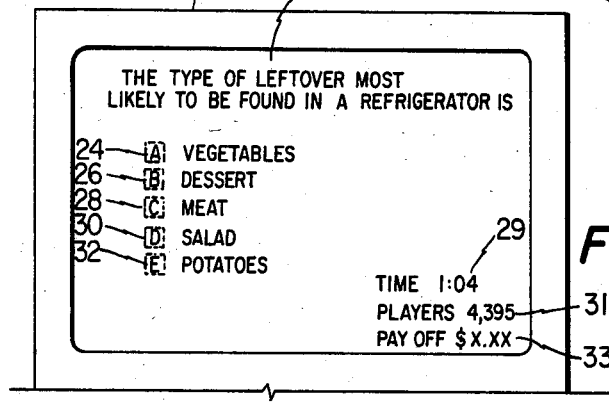
FIG. 2 illustrates a frontal view of the display in one of the remote display terminals.

Referring now to FIG. 2, there is illustrated a sample question with a set of corresponding responses. The sample question with associated subjective responses that are displayed on the display 16 are as follows:

|   | The type of leftover most likely to be found in a refrigerator is _____. |
|---|---|
| A. | Vegetables |
| B. | Dessert |
| C. | Meat |
| D. | Salad |
| E. | Potatoes |

The response letter A for the first response has a touch area 24 disposed therearound, the response letter B for the second response has a touch area 26 disposed therearound, the response letter C for the third response has a touch area 28 disposed therearound, the response letter D for the fourth response has a touch area 30 disposed therearound, and the response letter E for the fifth response has a touch area 32 disposed therearound. Each of the touch areas 24-32 is represented by dotted lines around the respective response letters which are visable to the individual so that they can distinguish where to touch in order to provide their response. When touching the screen, an electronic signal is provided to distinguish between the touch areas 24-32. Alternatively, switches may be provided on terminal 12 instead of using touch areas on the screen.

In the example of FIG. 2, the player has been instructed prior to the display of the query that he will receive a reward if he selects the response that was least selected by the other players at the different locations for display terminal 12. Therefore, it is the goal of the player to try and outguess the other players, who represent a relatively large information pool. It is not the objective of the player to guess the most likely answer, but, rather he is trying to determine which response the other players would choose as a least likely response and avoid that response.

In addition to displaying the query and the subjective responses on the display, a time limit is also displayed at a location 29 that tells the player how much time he has within which to input his response. If he does not input his response within the allocated time limit, he may forfeit the game, be provided an additional game or receive a refund. In addition to the time limit, the number of players that are playing the particular game and are interfaced with the central station 10 is displayed at a location 31 on the display 16. Depending upon the number of players and the number of responses provided, the reward can be calculated and displayed as a "pay-off" at a location 33 on the display 16. For example, if each of the five responses in FIG. 2 are equally subjective, each will have a selection probability of 0.2. Therefore, for a large player pool, the pay-off could be as high as four times the amount charged to play the game minus the overhead costs to run the system. This would be a projected payoff which can be displayed prior to selection of a response. Since the queries and associated responses are subjective, they may be used repeatedly until the subjective nature of the responses is altered by use.

In utilizing the system, a player views the display 16 and is presented with some form of promotional video program explaining the basic features of the game. To initiate play, the player inserts some form of currency or token into the receptacle 18. An explanatory video program is then presented to the player to explain the operation of the game and then the query with associated responses is displayed for viewing by the player. The player is provided a certain duration of time in which to select the response. This is displayed at the location 29. This time may vary depending upon when the question was initially transmitted to all of the terminals. For example, one player at a first location may initialize play at time "zero" and another player at a second location may initialize play fifteen seconds later. If the total time allowed for play by the system is thirty seconds, the second player would only be provided fifteen seconds for selection of his response whereas the first player is provided thirty seconds.

After the player has selected his response, he presses the respective one of the touch areas 24-32 to enter his particular response. This response is then transmitted to the central station 10 and compared to the responses from the remaining display terminals 12. The central station 10 determines which of the responses was the least chosen response and transmits this back to the remote display terminals 12. This is displayed for the player and, if his response corresponds to the least chosen response, a reward is provided to a player in the form of currency through the dispenser 20. However, the player can also select the option to play a series of questions and have his reward determined upon the percentage of least chosen responses.

In addition, the central office 10 calculates the percentages of "correct" responses from all stations 12 and transmits signals through the data link 14 to stations 12 which indicates the amount of currency or tokens to be paid to the winner. For example, the lower the number of winners for a particular contest, the greater the reward paid to the winners. If a player wins a plurality of consecutive contests, the reward is increased proportionately.

In normal operation, the central station 10 will cause identical questions to be displayed on all stations 12 for a short interval of time. All responses input during that time interval are considered by the central station 10 when picking the least chosen answer. After the time interval, a different question is displayed on the stations 12 and answers from all stations 12 to the new question are collected and evaluated by central station 10.

Figure 3:
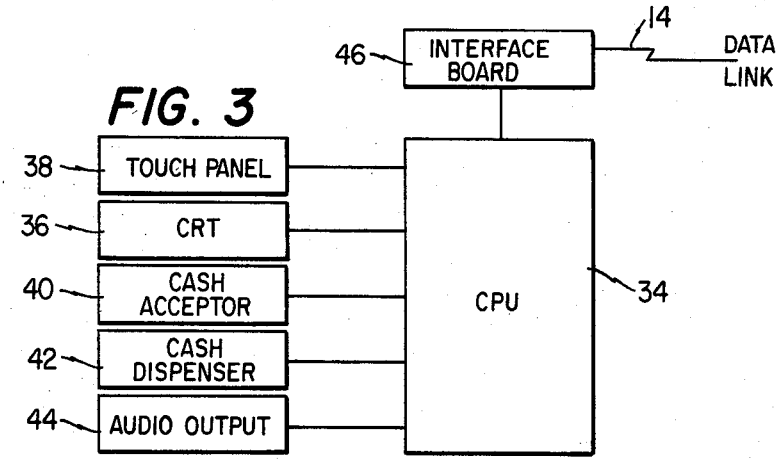
FIG. 3 illustrates a block diagram of a remote display terminal.

Referring now to FIG. 3, there is illustrated a block diagram of the display terminal 12. The terminal 12 includes a central processing unit (CPU) 34 that controls the entire operation of the display terminal 12. The CPU 34 can be any type of microprocessor-based system such as that utilizing a Z-80 microprocessor manufactured by Intel Corp. The CPU 34 is connected to a cathode ray tube (CRT) 36 and to a touch panel 38. The touch panel 38 is disposed over the illuminated face of the CRT 36 and, in combination with the CRT 36, forms the display 16. A currency acceptor 40 is connected to the CPU 34 and is operable to distinguish between various denominations of currency to determine if the proper amount has been deposited. The currency acceptor 40 is connected to the currency receptacle 18 on the front panel of the remote display unit 12. A currency dispenser 42 is connected to the CPU 34 for dispensing an amount of currency determined by the CPU 34. The currency dispenser 42 is also connected to the currency dispenser 20 on the front panel of the display terminal 12. An audio output 44 is connected to the CPU 34 and is operable to provide some form of audio signal to the player under control of the CPU 34 in addition to prestored digitized speech for predetermined messages.

An interface board 46 is connected between the CPU 34 and the data link 14. The interface board 46 is operable to convert data signals output by the CPU 34 into compatible signals for the data link 14. Since more than one remote data terminal 12 may occupy the same data link 14, it is necessary for the interface board 46 to occupy the data link at a time when the data link 14 is free from other communications. In addition, the interface board 46 also places a distinguishing identifier onto the data link 14 such that the central station 10 can distinguish between the various remote data terminals 12. In this manner, the central station 10 can communicate directly with individual ones of the remote display terminals 12 with the remaining remote display terminals 12 disregarding the information.

The CPU 34 includes storage which enables the answer chosen to be temporarily stored at the station 12. If the central station 10 subsequently notifies the CPU 34 that it has stored the correct answer, CPU 34 causes the correct reward to be paid. If desired, no storage need be provided at CPU 34 if central station 10 is provided with the capability to correlate each answer with its accompanying station and then notify the correct station 12 of a correct answer.

Figure 4:
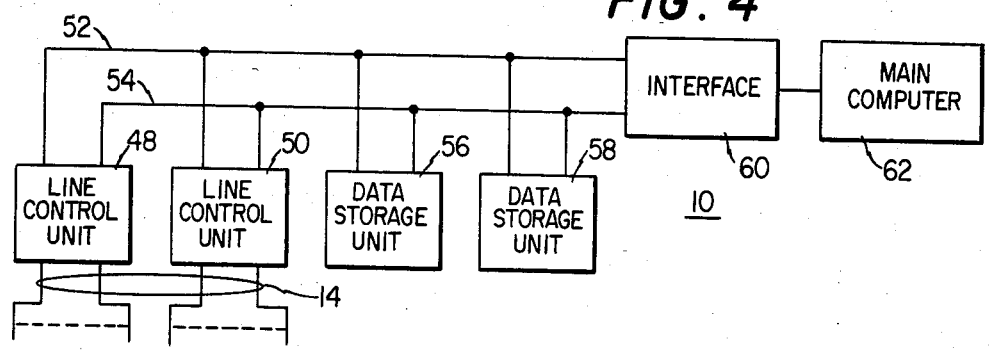
FIG. 4 illustrates a block diagram of the central station.

Referring now to FIG. 4, there is illustrated a block diagram of the central station 10. The central station 10 includes a line control unit 48 and a line control unit 50. Each of the line control units 48 and 50 are connected to the data link 14. Although the data link 14 is illustrated as one continuous data link, in the preferred embodiment it is a series of dedicated lines, each interfaced with a group of remote display terminals. Each of the line control units 48 and 50 are connected to a serial data bus 52 and to a serial data bus 54. A data storage unit 56 and a data storage unit 58 are also connected to the serial buses 52 and 54 to provide mass storage for data therein. An interface circuit 60 is connected to the serial data buses 52 and 54 to interface them with a main computer 62.

The line control units 48 and 50 are operable to communicate with the remote display terminals 12 that are connected to the portions of the data link 14 associated therewith and control addressing of the remote display terminals 12. The main computer 62 is operable to control the operation of the entire video entertainment system. It has the capability to input data for storage in the data storage units 56 and 58 and also for retrieving the data stored therein for review. In operation, questions and responses are input through the main computer 62 for storage in the data storage units 56 and 58. When a new question is to be supplied to the remote data terminals 12, each of the line control units 48 and 50 retrieves the same question and associated responses and stores them internal thereto. These questions and associated responses are then communicated to the associated remote display terminals 12. As responses are transmitted back to the central station 10 from the remote display terminals 12, they are received by the associated one of the line control units 48 and 50. Each of the line control units 48 and 50 then transmits this data to the data storage units 56 and 58. The data storage units 56 and 58 each make an independent determination of which response was the least selected response and this is then compared between the two units. If a true comparison is made, the line control units 48 and 50 are activated to transmit reward data back out to the display terminals 12.

The line control units 48 and 50 and the data storage units 56 and 58 are redundant to provide a high reliability system. For example, if one of the data storage units 56 or 58 fails, the other data storage unit maintains the status of the system. In a similar manner, if one of the line control units 48 or 50 fails, only one half of the data link is lost such that the system can continue to function until the defective line control unit can be repaired. In addition to having redundant line control units and data storage units, the serial buses 52 and 54 are also redundant. In normal operation with both serial buses 52 and 54 in operation, data transferred between the various units is split between the two buses. However, if one of the serial buses 52 or 54 is inoperative, all of the data is transferred along the remaining serial bus. The only effect of this is to increase data manipulation time.

Figure 5:
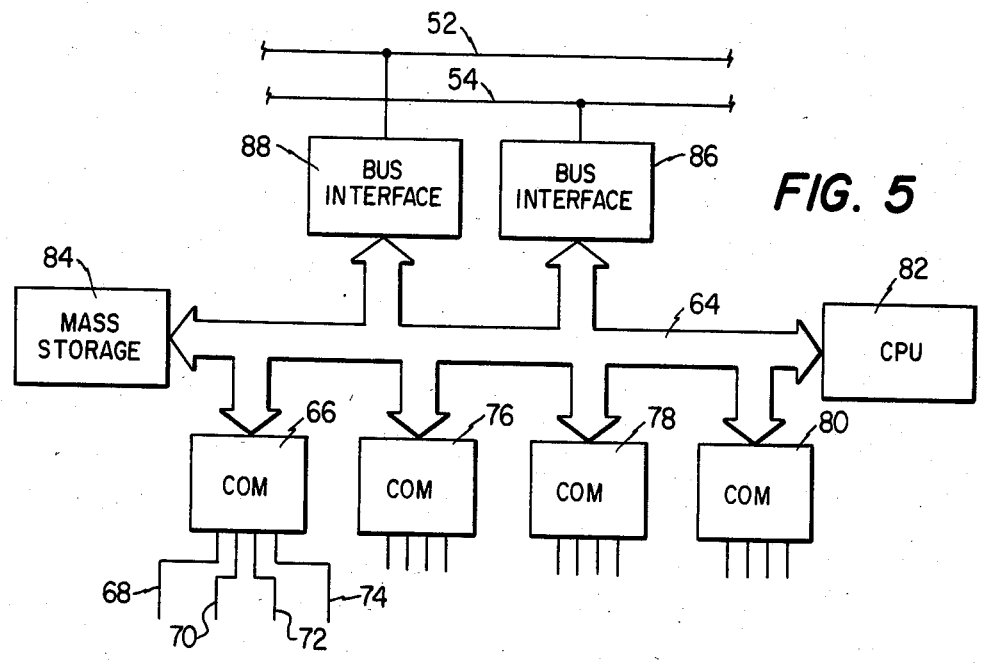
FIG. 5 illustrates a block diagram of the line control units.

Referring now to FIG. 5, there is illustrated a block diagram of the line control units 48 and 50. A data bus is provided for transferring data between various elements of the line control units. A communications board 66 is interfaced between the data bus 64 and data links 68, 70, 72 and 74. The data links 68-74 comprise a portion of the data link 14. Each of the data links 68-74 is operable to interface with twenty-four of the remote display terminals 12. Therefore, the communication board 66 interfaces between the data bus 64 and ninety-six of the remote display units 12. The communication board 66 is of the type MPC-4 manufactured by SD Systems, Inc. A communication board 76, a communication board 78 and a communication board 80 also interface with the data bus 64 and an additional 288 of the remote display units 12. By utilizing four communication boards, an additional degree of reliability is effected in that only ninety-six of the remote display units will be lost due to a malfunction in one of the communication boards.

A CPU 82 is interfaced with the data bus 64 and a mass storage unit 84 is also interfaced with data bus 64. The CPU 82 is of the type SBC-200 manufactured by SD Systems Inc., and the mass storage unit 84 can be any type of mass storage such as Random Access Memory (RAM), magnetic disk storage or tape storage. A bus interface 86 interfaces between the data bus 64 and the serial data bus 54. A bus interface 88 interfaces between the data bus 64 and the serial data bus 52. The bus interfaces 86 and 88 are MARS bus controller boards manufactured by SD Systems, Inc. The bus interfaces 86 and 88 include a self contained Z-80A microcomputer manufactured by Intel Inc., which can communicate with the main computer 62 through a dual access random access memory. Communication with the serial data link 54 is accomplished through onboard line drivers/receivers and optical isolators. Since the buses 52 and 54 operate at a much higher speed than the CPU 82 and the data transfer on the bus 64, the bus interfaces 86 and 88 are operable to provide a controlled data flow on the buses 52 and 54 to adequately communicate between the other elements attached thereto.

Figure 6:
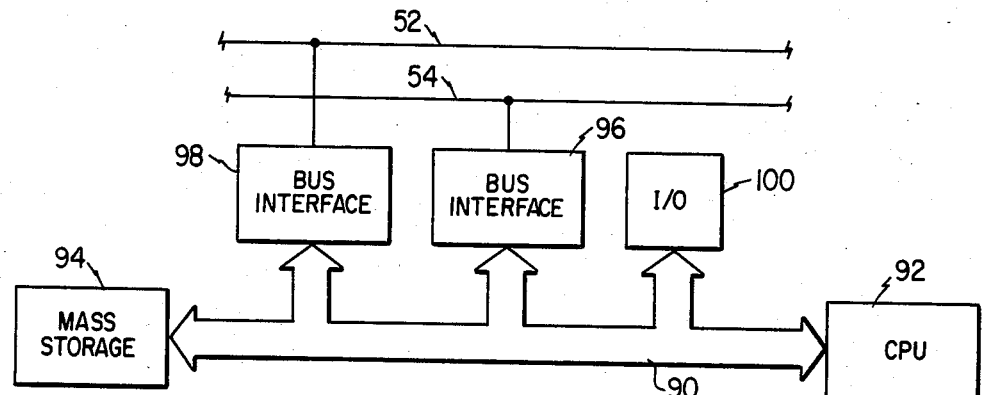
FIG. 6 illustrates a block diagram of a data storage unit.

Referring now to FIG. 6, there is illustrated a block diagram of the data storage units 56 and 58. A data bus 90 is provided for interfacing between various elements on the data storage units. A CPU 92, similar to the CPU 82, is interfaced with the data bus 90 and is operable to control all functions thereon and data flow between the various elements. An input/output (I/O) board 100 is provided to control the input/output functions of the data storage unit and a mass storage unit 94 is provided for storage of data therein. The mass storage unit 94 can be an electronic random access memory or some form of magnetic storage medium. A bus interface 96 interfaces between the data bus 90 and the serial data bus 54. A bus interface 98 interfaces between the data bus 90 and the serial data bus 54. The bus interfaces 96 and 98 are identical to the bus interfaces 86 and 88.

Referring now to FIGS. 4–6, the operation of the system will be described in more detail. When a communication is to be transferred to a plurality of remote display units, a particular question can either be input through the main computer 62 or be extracted from the data storage units 56 and 58 and placed onto the data link 14. In order to accomplish this, one of the data storage units 56 and 58 is activated to place the desired question and associated responses onto the serial data buses 52 and 54. The selection of a particular question can be at random or in a predetermined sequence. Once this data has been placed onto the serial data buses 52 and 54, the line control units 48 and 50 receive them since they have been preconditioned in a receive mode. This data is received by the bus interfaces 86 and 88 and then placed in the mass storage unit 84 through control of the CPU 82.

The communication boards 66–80 receive information from the data bus 64 and communicate it to the associated ones of the remote display units 12. The communications boards 66–80 determine when data is to be transmitted on the data link 14 and the particular remote display units 12 which are to be addressed. Upon receipt of the responses from the remote display units 12, the CPU 82 stores the responses in the mass storage unit 84 and this data is then transferred at the proper time through the serial data buses 52 and 54 to the data storage units 56 and 58. In the data storage units 56 and 58, the determination of which response was least selected is made. In addition to making this determination, the data storage units also determine how many responses were made in order to keep an accounting of the number of active remote display units 12 for a particular question. This information is used in determining the amount of reward that should be paid from the remote display units 12 which have originated a correct answer. After determination of the least selected response, a signal is placed back onto the serial buses 52 and 54 for receipt by the line control units 48 and 50. The signal is then relayed to all of the remote display units 12 in order that they may determine whether the player at their location had selected the least selected response. A signal is also transmitted which indicates the amount of reward to be provided to the winner. If so, a reward is given in the form of currency from the cash dispenser 20 to the player.

Figure 7:
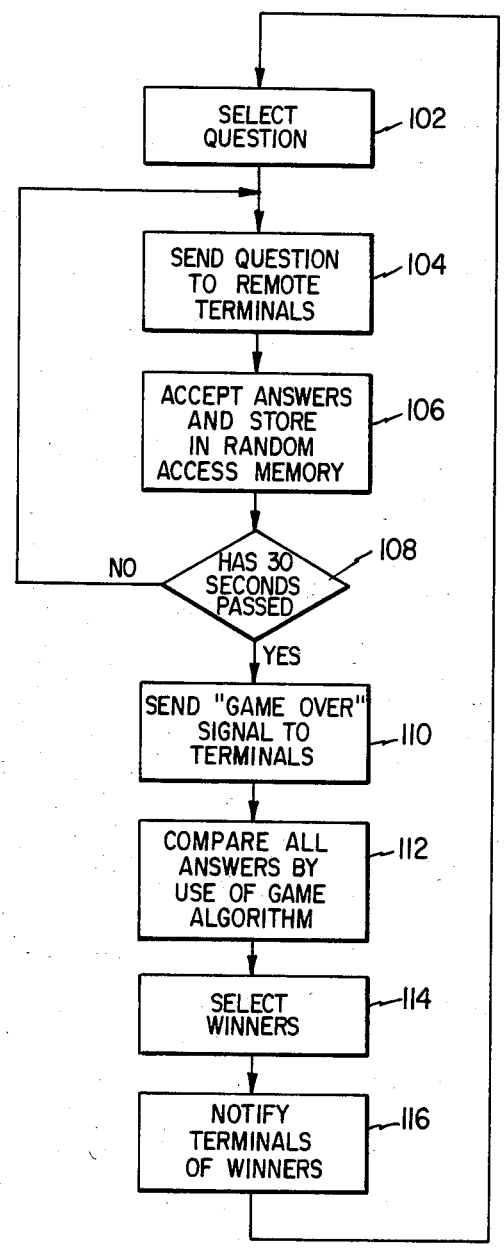
FIG. 7 illustrates a flow chart depicting the operation of the system.

Referring now to FIG. 7, there is illustrated a flow chart for the operation of the system in accordance with the present invention. The system is initiated at a function block 102 where a question is selected. As described above, there are a number of select questions with associated responses that are available to the system. These questions can be selected either at random or in a sequential manner. Since the responses to these questions are subjective, no real advantage is realized between the two types of selections. After selection at the central station 10, the program flows to a function block 104 and the question is transmitted to all of the remote terminals over the data link 14. If these terminals have been activated by the deposit of currency in the receptacle 18, they will receive the questions. The program then flows to a function block 106 wherein the central station 10 accepts the answers from the data link 14 and stores these answers in memory. The program then proceeds to a decision block 108 to decide if a predetermined duration of time has passed. In the preferred embodiment, this time interval is 30 seconds. If the 30 seconds has not passed, the program proceeds along the "N" path back to the input of the function block 104. The question is then transmitted back out over the data link 14 to the terminals and additional answers are accepted.

The function blocks 104–108 represent the amount of time that is provided to a particular player to answer the question. As described above, one player may gain access to the terminal on the first pass through these function blocks whereas another player may gain access to the question fifteen seconds later. In addition to sending questions to the remote terminals of the function block 104, the central station 10 can also determine the number of terminals that have gained access to the question and transmit this to all the terminals. In this manner, the player is provided with some form of feedback regarding the number of players he is competing against.

After the thirty seconds has passed, the program proceeds from the decision block 108 along the "Y" path thereof to a function block 110 in which a "Game Over" signal is transmitted to the terminals to indicate that additional responses will not be accepted. The program then flows to a function block 112 to compare the received answers from all of the stations 12 by utilizing a game algorithm to select the least chosen answer. The program then flows to a function block 114 to select the least chosen answer and then to a function block 116 to notify the terminals of the least chosen answer such that winners can be selected. After selection of a winner, the program flows from the function block 116 back to the input of the function block 102 to select an additional question.

Although the example described above utilizes an algorithm that selects the least chosen answer among a group of received answers, any type of algorithm can be utilized that allows the various players to interact. The algorithm need only depend upon the nature and makeup of the responses received from the players rather than on a stored correct answer. Therefore, the correct or winning response is determined by the algorithm as a function of the received responses and not an absolute function or value. For example, rather than selecting one of a group of multiple choice questions, such things as selecting the time for throwing a ball, selecting one of multiple targets or selecting various speeds or routes for running a race can be utilized for the game. The responses to these variations are then placed into an appropriate algorithm that picks one of the responses given as the winning response as a function of the number of people selecting that response. There is therefore no existing winning response until all of the selected responses have been received and processed through the algorithm.

In summary, there has been provided a video entertainment system that allows various players to interact with a given question. A player activates the system and then a question with various responses is provided. These responses are all subjective answers to the questions and it is up to the discretion of the player to select a particular response. The player has been instructed that selection of a response that was the least selected response by the other players at various remote locations will result in a reward. Therefore, the player must try to outguess the other players.

Although the perferred embodiment has been described in detail, it should be understood that various changes, substitutions, and alterations can be made therein without departing from the spirit and scope of the invention as defined by the appended claims.

What is claimed is:

1. A two-way video entertainment apparatus for accomodating a plurality of players at different remote locations, comprising:
   a central receiving and processing station;
   a plurality of remote display units;
   a two-way data link connecting said central station to said remote display units;
   said remote display units each having:
   means for receiving prompting data from said data link, said prompting data comprised of a query portion indicating a question in a predetermined category and a response portion indicating a select group of correct answers for the question,
   means for displaying said prompting data,
   means for inputting a response from a player to the displayed prompting data, the response being one of the select answers,
   means for transmitting said response to said central station over said data link, and
   means for indicating a winning response to the player; said central processing station having:
   means for generating said prompting data and transmitting said prompting data onto said data link for reception by all of said remote display units,
   means for receiving said responses from said remote display units through said data link;
   means for comparing said responses from all of said remote display units to determine the winning response, the winning response being a predetermined function of the responses received from all of said remote display units that return responses such that each player is playing against the remaining players, the selection of any of the answers by the player having an unknown selection probability, and
   means for transmitting a winning response signal to said remote display units that is indicative of the winning response, said winning response transmitting means operable to activate the winning response indicating means in the ones of said remote display units which received the correct response from the player at that location.

2. The video entertainment apparatus of claim 1 wherein said responses are subjective.

3. The video entertainment apparatus of claim 1, wherein said prompting data is received by all of said display units at essentially the same time such that said promoting data instruction is available to all of the players at essentially the same time.

4. The video entertainment apparatus of claim 1 and further comprising means for receiving a sequential prompting instruction and storing results of said responses in order to make new responses to said sequential prompting instruction.

5. The video entertainment apparatus of claim 4 wherein a reward is provided to the winning players which is determined by the number of winning responses.

6. The video entertainment apparatus of claim 1 wherein the winning response is the least chosen response from all of the players.

7. A two-way video entertainment apparatus for accomodating a plurality of players at remote locations, comprising:
   a data link for carrying prompting and reward data;
   a central station interfaced with said data link for transmitting prompting data onto said data link and controlling data flow therein;
   a plurality of remote terminal units, each unit for use by an individual player and interfaced with said data link, each of said terminal units having:
   means for receiving said prompting data from said data link, said prompting data comprised of a query portion indicating a question in a predetermined category and a response portion indicating a select group of correct answers limited in number and being subjective in nature, the answers having an unknown selection probability,
   means for displaying prompting instructions in response to receiving said prompting data,
   means for allowing the player to select one of the responses,
   means for allowing the player to input a sum of money to gain access to said terminal,
   means for transmitting the selected response to said data link,
   means for receiving a signal from said data link indicating the number of said terminals having access thereto and displaying the number for viewing by the player, means for receiving a reward signal from said data link and means for providing the player with a reward if the response provided by the player corresponds to said reward signal;

said central station having:

means for generating said prompting data and transmitting said prompting data onto said data link, means for determining the number of said terminals having access to said data link and generating a signal indicating the number of said accessing terminals to all of said accessing terminals;

means for receiving said selected responses from said accessing terminals on said data link, means for determining which of said responses was the winning response according to a prestored algorithm, said algorithm determining the winning response as a function of the received responses, said algorithm determining the winning response as the least chosen response from the answers provided in said prompting data, means for generating said reward signal and transmitting said reward signal on said data link for reception by said remote data terminals, said reward signal containing data indicative of the winning response, each of said remote data terminals rewarding the player if the response provided thereat corresponds to the winning response.

8. A video entertainment method for use by a plurality of players at remote locations, comprising:

generating prompting data at a central location, the prompting data comprised of query portion indicating a question in a predetermined category and a response portion indicating a select group of correct answers limited in number and being subjective in nature, the answers having an unknown selection probability;

transmitting the prompting data to a plurality of remote terminals at remote locations;

displaying prompting instructions to the players at their remote locations in response to receiving the prompting data to aid a player in utilizing a remote terminal;

determining at the central location the number of remote terminals accessing the prompting data and transmitting the number to the remote terminals for display to the player;

receiving a response from the player which constitutes a selection of one of the answers and transmitting the response to the remote central location and storing the response at the location;

transmitting the stored response to the central location;

comparing the responses from all of the remote locations at the central location and determining which response was the least selected one, the least selected response being a function of the responses provided by the players at the remote terminals such that the players' subjective perspective towards selecting one of the answers determines the outcome;

transmitting a reward signal back to all of the remote locations from the central location, the reward signal having contained therein an indication of the least selected response;

determining at each of the remote locations if the received response from the player at that location corresponds to the least selected response; and providing a reward if the response provided by the player corresponds to the least selected response.

9. The method of claim 8 wherein the step displaying the prompting instruction comprises displaying a prerecorded message informing the player how to input his response and, after the message has been displayed, displaying both the query portion of the prompting data and the response portion of the prompting data in a form that allows the player to select one of the answers.

10. The method of claim 8 and further comprising accruing results of the players' selection of a given response and presence or absence of a reward for that response over a plurality of sequential sets of prompting data generated at the central location.

11. The method of claim 8 wherein the award is provided to the player only after a successive number of proper chosen responses.

* * * * *

UNITED STATES PATENT AND TRADEMARK OFFICE
CERTIFICATE OF CORRECTION

PATENT NO. : 4,593,904
DATED : June 10, 1986
INVENTOR(S) : Gordon T. Graves

It is certified that error appears in the above-identified patent and that said Letters Patent is hereby corrected as shown below:

Col. 2, line 66, "As Will be" should be --As will be--.

Col. 9, line 49 (Claim 1), "accomodating" should be --accommodating--.

Col. 10, line 43 (Claim 7), "accommodating" should be --accommodating--;

line 48 (Claim 7), "therein" should be --thereon--.

Col. 12, line 9 (Claim 8), delete "remote";

line 10 (Claim 8), between "the" and "location", insert --remote--.

Signed and Sealed this

Twenty-first Day of October, 1986

[SEAL]

*Attest:*

DONALD J. QUIGG

*Attesting Officer*   *Commissioner of Patents and Trademarks*